May 10, 1938.　　　C. R. BUSCH　　　2,116,594
BRAKE BEAM AND/OR BRAKE HEAD
Filed Feb. 16, 1935　　　2 Sheets-Sheet 1
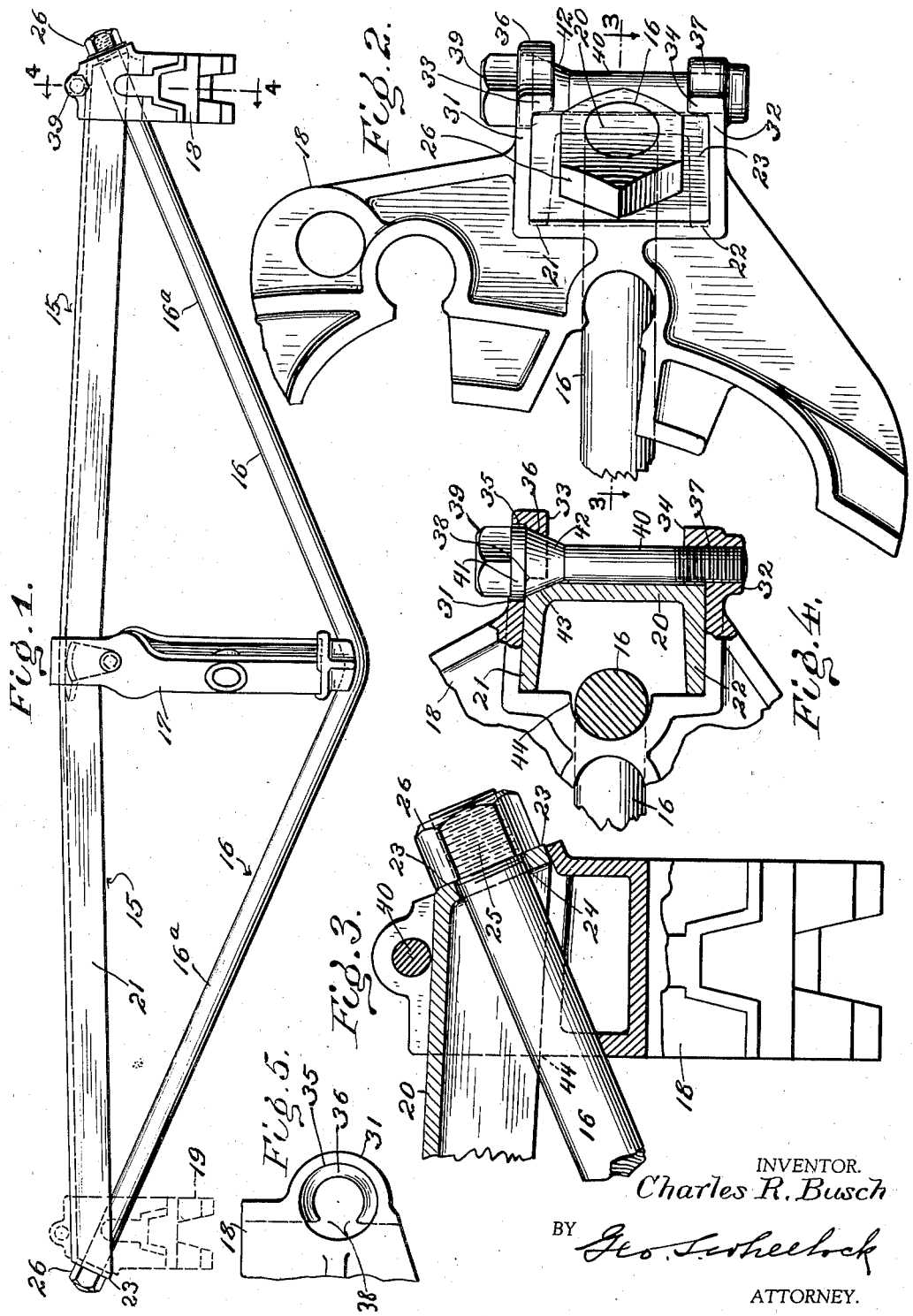
INVENTOR.
Charles R. Busch
BY Geo. T. Wheelock
ATTORNEY.

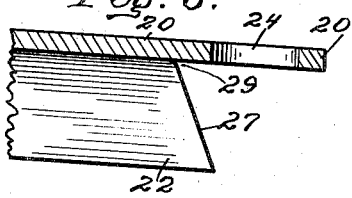
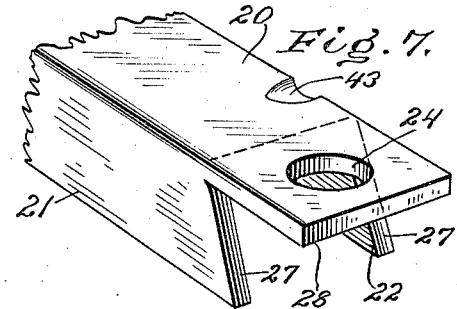
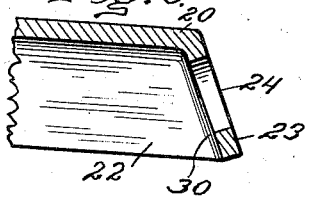
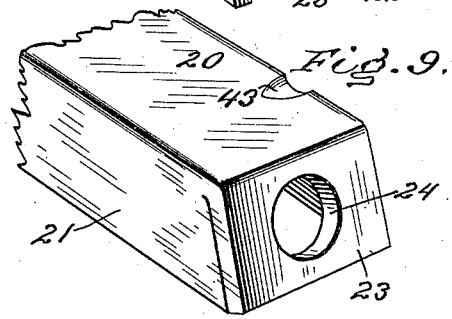
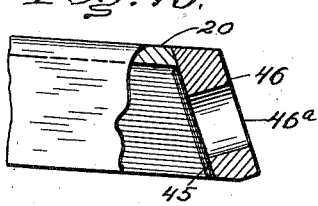
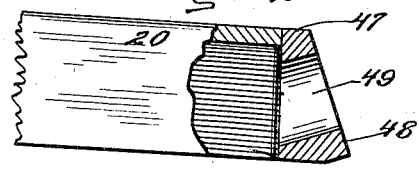
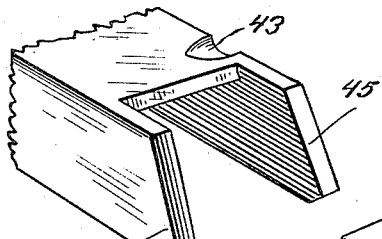
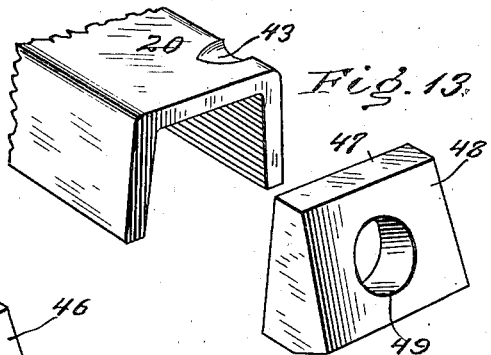
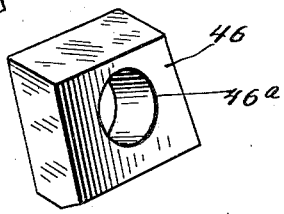

Patented May 10, 1938

2,116,594

UNITED STATES PATENT OFFICE 2,116,594

BRAKE BEAM AND/OR BRAKE HEAD

Charles R. Busch, Orange, N. J., assignor to Buffalo Brake Beam Company, New York, N. Y., a corporation of New York Application February 16, 1935, Serial No. 6,876

12 Claims. (Cl. 188—223)

The present invention relates to improvements in brake beams themselves as distinguished from the brake heads which usually constitute necessary parts of a working brake beam and to brake heads mounted on the brake beam, both the beam and the heads having special features of construction to meet the requirements of railways and railway associations. While the present invention so far as it relates to the brake heads may be applied to any suitable type of brake beam, one of such requirements is that each beam include a compression member and a tension member or rod, together with a strut or fulcrum member, the function of the strut being principally to enable tension exerted on the ends of the tension rod to cause the cambering of the compression member.

The present invention therefore relates more particularly to improvements in brake beams which include a compression member and a tension member or rod. An important object of the invention is to so construct each beam, excluding the brake heads as parts thereof, that it constitutes a beam unit, the ends of which are equipped with take-up means for exerting the necessary tension on the tension member and the necessary thrust on the compression member, such take-up means being independent of the brake heads.

It is one of the requirements of many railroads that the brake heads be removable from the beam, so that where necessary other brake heads may be substituted on the same beam, and the type of combined beams and brake heads usually in vogue, although there are some exceptions, requires or necessitates that the brake heads be utilized as necessary components of a complete brake beam outfit; that is to say the brake heads are usually assembled with the compression and tension members, and they constitute necessary parts to enable the tension applied to the tension rod to cause the desired camber of the compression member. With such types of combined brake beams and heads the practice is to entirely remove a brake beam with its necessarily attached heads from a car truck when and if other heads are to be substituted, and usually to take the removed combined parts to the railway shop so that the entire beam may be disassembled for removing the heads, it being then necessary to reassemble the parts with substitute heads.

With these difficulties in mind, it is an important object of the present invention to provide a brake beam unit, preferably in the form of a truss, which is complete in itself, so far as the beam is concerned independently of the heads, so that especially when the beam is provided with take-up means, the brake heads may be slipped over the ends of the beam unit without disturbing any parts of the beam, and rigidly mounted upon the ends thereof, for which purpose the ends of the beam, that is the ends of the compression member, are provided with bearings onto which the brake heads may be tightened and held in rigid using position.

Preferably, a specific object of the invention involved, with respect to the means for rigidly mounting the heads removably on the ends of such a beam as referred to, is to provide the heads with a sort of combination centering and locking fastening; that is with means preferably for centering the heads in proper position relatively to the length of the beam and for locking the heads in the centered position in such way as that the heads are maintained in such position as well as prevented from movement around the beam. In other words, it is an object in these connections to so construct each brake head that when it is properly mounted on the beam it is held rigid with respect to the required position on the beam which it must have relatively to the car wheel to which its brake shoe is intended to brake against.

In connection with the preferred objects of the invention as explained, it is preferred and it is possible to maintain the tension member or rod in such shape that the end halves or lengths thereof remain straight, for obtaining proper tension and thrust relations with respect to the tension rod and the compression member, respectively.

These being among the preferred objects of the present invention, the same consists of certain features of construction and combinations of parts to be hereinafter described and then claimed with reference to the accompanying drawings illustrating suitable embodiments of the invention and wherein Fig. 1 is a plan of the improved brake beam unit with the improved brake heads applied thereto;

Fig. 2 is an enlarged end elevation of the beam unit with a brake head mounted thereon, the major portion of the unit being omitted;

Fig. 3 is a section taken on line 3—3 of Fig. 2, parts being broken away and parts in elevation;

Fig. 4 is a detail section on line 4—4, Fig. 1, to more clearly illustrate the means for locking and centering a brake head on the beam;

Fig. 5 is a broken detail elevation of one of the clamps of a brake head as viewed from the outside of the clamp;

Fig. 6 is a broken sectional detail view of a compression member showing a step in the method of constructing the same for ultimate use;

Fig. 7 is a perspective view of such end to more clearly illustrate such step;

Fig. 8 is a broken sectional detail of such end of the compression member illustrating the next step in forming the same;

Fig. 9 is a perspective view to more clearly illustrate the step shown in Fig. 8;

Fig. 10 is a broken detail view of one end of a compression member to illustrate a modified construction;

Fig. 11 is an exploded perspective view to more clearly illustrate the construction shown in Fig. 10;

Fig. 12 is a broken detail view showing another modification in connection with the compression member; and Fig. 13 is an exploded perspective view to illustrate more clearly what is shown in Fig. 12.

Figs. 7, 9, 11, and 13 of the drawings consider the compression member as viewed from the left hand end of Fig. 1.

Referring to Fig. 1, the compression member 15, the tension member 16 and the strut or fulcrum member 17 may be of the usual types, with such added improvements to the compression member as are intended under the present invention. The compression member is preferred to be of the usual channel section and the tension member 16 in the form of a rod or bar which is of sufficient tensile strength to permit the strut 17 to be used as a fulcrum with respect thereto, to enable the tension member to impart the required camber to the compression member. As will hereinafter be fully described the beam itself including such members is preferably constructed as a self-contained beam unit or truss unit, whereto brake heads 18, 19 may be applied at opposite ends of the beam.

The enlarged views Figs. 2, 3, 4 illustrate the preferred construction of each beam unit and of each brake head to be applied thereto, although in Fig. 1 some of the specific features now to be described are also shown. The compression member 15 being of channel cross-section is provided with a web 20 and side flanges 21, 22. The web 20 usually extends vertically with respect to the normal horizontal plane of the beam, while the flanges 21, 22 extend toward the tension member or rod 16. Each end of the compression member is provided with a transverse bearing seat or member 23, preferably integral therewith, and constructed as hereinafter explained, that is to say each bearing seat 23 is an actual extremity of the compression member 15. Preferably each bearing seat 23 is inclined away from the web 20 and extends across the space between the side flanges 21, 22, and preferably does not extend beyond the width of each flange, as more clearly illustrated in Fig. 3. Each bearing seat 23 is provided with a hole 24 which is of very slightly greater diameter than that of the tension rod 16 to permit the rod to pass through.

The tension member 16 in engaging at its middle portion over the strut 17 is distinguished by two sections 16a, 16a at each side of the strut, and these lengths or sections preferably remain straight throughout in accordance with the usual standard practice. The extreme end portions 25 of the tension member 16 are screw-threaded and each end portion is entered through the hole 24 at a corresponding end of the compression member, so that the two halves of the tension member partially pass between the flanges 21, 22 of the compression member, the straight halves 16a of the tension member passing through the bearing seats 23 on a slant with respect to the length of the compression member, enabling the screw-threaded extremities 25 to be disposed outwardly from the bearing seats 23, each at an angle of ninety degrees with respect to the plane of its adjacent bearing seat 23.

The ends of the tension member 16 having been entered through the holes 24 so as to project therefrom, fastening elements 26 are properly engaged with the projecting ends of the tension rod so as to take up tension on the rod while at the same time having a thrust relation directly with the ends of the compression member 15. Preferably the fastening elements 26 are in the form of screw-threaded nuts which may be screwed in as far as necessary upon the screw-threaded end portions 25 of the tension member or rod. It is obvious, with bearing seats 23 strong enough to resist the required thrust of the nuts 26, that tension to the required extent may be imposed on the tension rod and through the medium of the strut 17 the required fulcrum is provided to permit of the required cambering of the compression member, as simultaneously with obtaining the tension on the tension member, the direct thrust of the nuts 26 is imposed on the extremities of the compression member to produce the camber thereof. To complete the shelf-contained brake beam unit, which it is as a matter of fact, the extremities of the tension member protrude sufficiently beyond the nuts 26 so that they may be upset against the nuts to thoroughly bind and connect the nuts with the tension member.

It is obvious from the description and illustration of the preferred construction of brake beam or truss unit that the unit is complete of itself so far as it is necessary to impose the desired thrust upon the ends of the compression member in order to camber it and to combine the tension member therewith as a complete self-contained unit including of course suitable fastening elements for producing tension and thrust where the compression and tension members pass at the ends of the beam. In other words, the self-contained brake beam or truss unit being self-contained as to all its necessary parts, it is possible to remove and replace any broken or damaged brake head on such a unit without having to remove the unit from the car truck on which the brake beam is located.

Before explaining the details of the preferred construction of brake head, the preferred construction of bearing seats 23 at the ends of the compression member and the preferred method of providing them will be explained with reference to Figs. 6, 7, 8, and 9. The flanges 21, 22 of the main body of the compression member are shown as cut away at one end so as to provide inclined transverse edges 27, the inclination being in a direction away from the web 20. This will leave a tongue 28 as an extension of the web 20, as shown in Figs. 6 and 7, which tongue extension is punched in order to provide the hole or aperture 24 before mentioned. As the compression member is made of bendable metal, such as steel, the tongue 28 is subjected to the action of a bending press or the like to bend it down against the inclined edges 27 as shown in Figs. 8 and 9, due to which action the hole 24 is positioned between the flanges 21, 22, and the tongue extension therefore spans the space between such flanges, its extremity extending down to the free edges of the flanges. The tongue will therefore be set at an inclination outwardly from the web 20 to correspond with the inclination of the edges 27. Before bending the tongue 28 the inner upper corners of the flanges 21, 22 are cut at the same time as the inclinations of the flanges so as to be rounded off at 29, so that, in bending down the tongue, its bend where it joins with the web 20 takes the rounded form of the round corners or shoulders 29, thereby avoiding a sharp bend in the web. After bending the tongue so that it is disposed as closely as possible to the inclined edges 27, the joints are preferably welded together and fillings of molten metal are introduced into the inner angles between the bent tongue and the flanges so as to provide fillets 30, one at each flange. In this manner the tongue 28 to form the ultimate seat member 23 is secured throughout its edges integrally with the adjacent edges of the flanges, whereby to make a rigid and strong seat member, one at each end of the compression member. This enables the seat members to take care of the necessary thrusts which are imposed thereon when the tension member is assembled with the compression member, the nuts before mentioned being screwed firmly inwardly so as to tense the tension member and at the same time impart the necessary end thrusts to the compression member in order to camber it as shown in Fig. 1.

Now again referring to Figs. 1, 2, 3, and 4, the preferred construction of each brake head 18 or 19 will be described. Each brake head of course should have the necessary lugs, toes and key-way to receive a brake shoe and to enable the same to be secured to the face of the brake head by means of a key. Each brake head is preferably formed of malleable iron and is provided at its back with clamps or clamping members 31, 32 cast integrally with the brake head, and forming a recess or socket between the clamps. The inner faces of the clamps are spaced closely enough apart so that they may be caused to directly bear upon opposite sides of compression member 15. These clamps extend transversely of the brake head proper for that purpose and are adapted to be forced together by a suitable fastening element, the inner portions of the opposed clamps being provided with overhanging or inwardly presented jaws or bosses 33, 34. A hole is formed through the clamp 31 residing in a short cylindrical shaped socket 35 in the outer face of the clamp and a tapered or conical wall 36 which extends inwardly from the socket 35, the taper being formed on the inner surface of the inwardly projecting jaw or boss 33, as shown more clearly in Fig. 4. In connection with the hole 35, 36 reference may also be had to Fig. 5 which is a view looking at the outer face of the clamp 31. The other clamp 32 has a hole 37 aligned with the hole 35, 36 and partially cut away inwardly at the inner face of the jaw or boss 34. Preferably the hole 37 is screw-threaded. Preferably also the jaw 33 is cut away at 38 to leave an opening which is presented in a direction towards the brake head proper.

When the clamps 31, 32 are constructed as described they are adapted to receive a fastening in the shape of a through bolt having a wrench head 39 and a shank 40 which is screw-threaded at its outer end, there being a short cylindrical length 41 of the bolt material directly next to the head 39 and following that a conical portion 42 which is tapered inwardly towards the shank 40, such taper merging with the shank. When the bolt is positioned on the brake head its screw-threaded end is in engagement with the screw-threaded hole 37, the enlarged cylindrical portion 41 of the bolt being positioned in the cylindrical socket 35 of clamp 31 and the conical portion 42 positioned within the tapered portion 36 of the hole in clamp 31. The conical portion 42 of the bolt will then protrude at cutout 38 somewhat inwardly towards the brake shoe head proper so that that portion of the bolt can constitute a fastening element.

The recess or socket between the clamps 31, 32 at the back of each brake head is of such dimensions between the clamps and underneath the bolt connecting them as not to interfere with the slipping of a brake head onto one end of the compression member 15, which end has a cross-section corresponding substantially with the space between the flanges and between the bolt and the bottom of such space or recess. The brake head may be slipped onto the beam either with or without having the bolt mounted on the clamps, but it is preferred to simply assemble the bolt with the brake head before applying the same to the beam, inasmuch as in their unset condition the clamps 31, 32 will be sufficiently spaced apart to enable a fairly loose fit of the brake head onto the beam. In such case the conical portion 42 of the bolt constituting a fastening element is in such position relative to a notch or recess in the compression member, that when the bolt is tightened up, the combined action of the recess 43 and the conical portion 42 entering it will automatically act to center the brake head in proper position longitudinally of the beam, and when the bolt is turned up to its desired limit, the clamps 31, 32 will strongly be pressed into a binding engagement with the opposite flanges of the compression member, and the whole brake head will be solidly and rigidly mounted upon and bound to the end of the compression member. In other words, the bolt not only acts as means for accomplishing the centering of the brake head upon the compression member, but in its action on the clamps it firmly binds the brake head upon the compression member, so as to obtain the desired rigid and centered position of the brake shoe with reference to the car wheel whose tread is to be properly engaged by the brake shoe mounted on the head. The shank 40 of the bolt may be caused to contact with the web of the compression member if the parts are so proportioned or it may be slightly spaced away from the compression member, as shown in Fig. 4.

In connection with the centering of the brake shoe head on the beam, and more particularly to serve to offset any tendency for the head to slightly turn with respect to the axis of the beam, the head is provided with an inner recess 44 at its inner wall which receives and permits the passage of the tension rod 16, which may, if desired, be caused to engage the bottom of such recess. This means that recess 44 acts in connection with the lateral fastening element or conical portion 42 of the bolt in properly centering the brake shoe head upon the beam, in the act of applying the head to the beam, as well as after the head has been firmly and rigidly locked to the beam.

As to the recess 43 in the compression member, that is more clearly illustrated in Figs. 7 and 9, where it will be seen that the recess cuts diagonally across a corner formed by the web of the compression member and one of its flanges. This recess preferably has a contour such as to correspond with the approximate contour of the fastening element or tapering portion 42 of the bolt.

It now becomes fully apparent from the foregoing description that in the preferred construction of the present invention the brake beam proper is a self-contained truss structure constituting a unit, the fastening elements therefor at the ends of the compression and tension members being adapted to take up the members by imposing the necessary tension on the tension rod and the necessary thrust on the compression member, so that such self-contained unit provides inherent means for placing the necessary set-up stresses on the elements of the brake beam before the same is combined with the brake heads. If a brake head on such a beam becomes broken or damaged it can be removed readily by loosening the through bolt so as to release the clamps 31, 32 from the compression member, whereupon such brake head can be readily slipped off the end of the beam, and just as easily can another brake head be substituted therefor by slipping it over the ends of the beam into position for centering and rigidly locking it thereupon.

It is obvious that the invention shown and described is susceptible to more or less modification without departing from the appended claims, as, for example, the construction of the compression member may be slightly modified as shown in Figs. 10, 11, 12, and 13. In Figs. 10 and 11 the end portion of the web of the beam is shown as removed so as to provide flange extensions 45 away from the cut-off edge of the web. A plug 46 may be seated between the flange extensions 45 so as to fill up the intervening space, the upper edge of the plug abutting the edge of the web of the compression member, such plug being welded to the flange extensions 45 and to the adjacent end edge of the web, and it is obvious that fillets may be run into the inner corners between the plug and the flanges of the compression member, and that that portion of the plug which abuts the web may be provided with an overhang which may likewise be welded to the outer surface of the web. The plug may be shaped as shown in Figs. 10 and 11 so that its upper and lower surfaces properly merge with the surfaces of the compression member, the plug being set at an inclination and being provided with a hole 46a to permit the passage of the tension rod through the plug, which is to constitute a bearing seat or seat-member.

Another possible modification shown by Figs. 12 and 13 resides in cutting the end of the compression member off square and then imposing thereupon a casting 47 shaped to fit squarely against the square end of the compression member and having an outer inclined surface 48, a hole 49 being made through the casting so as to receive one end of the tension member and to enable the casting 47 to serve as a bearing seat or seat member, so that when there is a similar construction at both ends of the compression member, the tightening up of the fastening elements bearing on the seats will enable tension to be obtained on the tension rod and end thrusts to be imparted to the compression member. Such casting 47 may be thoroughly welded and united with each end of the compression member in any well known manner so that the parts are made integral.

The compression member disclosed is a structural element in and of itself to constitute a part of a brake beam, and it is to be noted that the perforated bearing seats 23 or otherwise are permanently united with the extremities of the member constituting such structural element, and the outer surfaces of such seats constitute bearing surfaces extending at an inclination to the length of the member and across and over the sides of the member, and that the cross-section along the outer surfaces of such member is maintained substantially uniformly up to the inclined bearing surfaces of the seats so as to strip and bare the end portions of such member up to said inclined surfaces, whereby to provide the ends of the member with exposed outer surfaces which are continuations of the outer surfaces of the member and onto which brake heads may be directly fitted, thereby avoiding the use of separate sleeves onto which brake heads have customarily been fitted.

What I claim is—

1. A brake beam, including a cambered compression member of substantially uniform dimensions from end to end, a tension member, means for fastening the ends of the compression member and tension member together, and being in tension relation to the tension member and in thrust relation to the compression member, and thrust receiving means on the ends of and between the sides of the compression member and forming integral terminal parts thereof, and in bearing relation with the fastening means, wherethrough tension imposed on the tension member by the fastening means will cause the compression member to be set to the desired camber from points between the sides of the compression member, the outside surfaces of the thrust receiving means being continuations of the uniformly cross dimensioned compression member.

2. In combination with a brake beam including a channeled compression member and a tension member, brake heads, means for securing the heads to the compression member, means co-acting with the heads and directly engaging the web of the compression member for centering the heads on the compression member, and means on the heads spaced away from the web for centering the heads on the tension member.

3. In combination with a brake beam including a compression member and a tension member, brake heads slidably engageable directly upon and over the ends of the members, means for removably securing the heads to the beam, and means on the heads for centering the heads longitudinally of the beam, such means separately directly engaging the compression member and tension member at opposite sides of the beam.

4. In combination with a brake beam having a compression member and a tension member, the compression member having notches in its ends, brake heads having sockets whereby they are adapted to be slipped over and fitted onto the ends of the compression member, and means for rigidly securing the heads removably on the compression member, such means being provided with elements to enter such notches and to center the heads on the beam, and the heads being formed to receive the ends of the tension member at points which are at opposite sides from the notches in the compression member, whereby to center the heads with respect to the length of the beam and to a definite position around the beam.

5. In combination with a brake beam, brake heads each provided with a pair of opposed clamps which are integral therewith and recessed at their inner faces to receive opposite sides of the beam, and an adjustable bolt connecting the clamps of each pair and adapted to cause the clamps to bind on the beam to hold the heads rigidly thereon, each bolt having a tapered portion at its wrench head only and the beam having recesses along one corner only to receive the tapered portions for bearing on the beam and centering the brake heads thereon.

6. A brake head having lugs and a face to receive a brake shoe, opposed clamps rigid with the back of the head to provide a socket therebetween, and an adjustable bolt connecting the clamps, the bolt having a lateral bearing enlargement between its wrench head and shank and located only at its wrench head.

7. A brake head having lugs and a face to receive a brake shoe, opposed clamps on the back of the head to provide a socket therebetween, and an adjustable bolt connecting the clamps, the bolt having a conical bearing enlargement between its head and shank and located only at its head, the greater length of the bolt being straight.

8. A brake beam, including a compression member, a tension member extending within and beyond the ends of the compression member, and the ends of the tension member remaining in line with the main portions of the tension member, bearing seats integral with the extremities of the compression member and inclined with respect to the length thereof, the cross-section at the outer surfaces of such compression member being maintained at substantially uniform dimensions up to the inclined outer surfaces of such seats, and fastening elements secured to the ends of the tension member and bearing on such inclined outer surfaces.

9. As an article of manufacture, a compression member for a brake beam, provided with perforated bearing seats permanently united with the extremities of the member, and the bearing surface of each seat extending at an inclination to the length of the member and across between the sides of the member, the cross-section along the outer surfaces of such member being maintained substantially uniformly up to the inclined bearing surfaces of such seats so as to bare the end portions of such member up to said inclined surfaces, whereby to provide the member with exposed outer surfaces which are continuations of the outer surfaces of the member and onto which brake heads may be directly fitted.

10. As an article of manufacture, a channeled compression member for a brake beam, provided with perforated bearing seats permanently united with the extremities of the member, and the bearing surface of each seat extending at an inclination to the length of the member and across between the flanges of the member, such seats being inclined outwardly away from the web of such member, and the cross-section along the outer surfaces of the web and flanges of such member being maintained substantially uniformly up to the inclined bearing surfaces of such seats so as to bare the end portions of such member up to said inclined surfaces, whereby to provide the web and flanges of the member with exposed outer surfaces which are continuations of the outer surfaces of the member and onto which brake heads may be directly fitted.

11. In combination with a brake beam having a compression member and a tension member, the tension member extending out through the ends of the compression member, and the compression member having notches in its ends, brake heads having sockets whereby they are adapted to be slipped over and fitted directly onto the outer surfaces of the ends of the compression member, and means for rigidly securing the heads removably and directly on the compression member, such means being provided with elements to enter such notches and to center the heads on the beam.

12. A compression member for a brake beam, the member being of channel form and having recesses at opposite ends thereof located in the outer corner of one of its angles and extending into the web of such member.

CHARLES R. BUSCH.